(12) United States Patent
Wietfeldt et al.

(10) Patent No.: US 11,720,512 B2
(45) Date of Patent: Aug. 8, 2023

(54) UNIFIED SYSTEMS AND METHODS FOR INTERCHIP AND INTRACHIP NODE COMMUNICATION

(71) Applicant: QUALCOMM Incorporated, San Diego, CA (US)

(72) Inventors: Richard Dominic Wietfeldt, San Diego, CA (US); Maxime Leclercq, Encinitas, CA (US); George Alan Wiley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/363,407

(22) Filed: Jun. 30, 2021

(65) Prior Publication Data

US 2021/0326290 A1  Oct. 21, 2021

Related U.S. Application Data

(62) Division of application No. 14/850,104, filed on Sep. 10, 2015, now abandoned.

(51) Int. Cl.
*G06F 13/40* (2006.01)
*G06F 13/38* (2006.01)
*H04L 43/0817* (2022.01)

(52) U.S. Cl.
CPC ........ *G06F 13/4027* (2013.01); *G06F 13/385* (2013.01); *G06F 13/4068* (2013.01); *H04L 43/0817* (2013.01)

(58) Field of Classification Search
None
See application file for complete search history.

(56) References Cited

U.S. PATENT DOCUMENTS 5,199,106 A  3/1993  Bourke et al.
6,157,967 A  12/2000  Horst et al.
(Continued)

FOREIGN PATENT DOCUMENTS

CN  103838698 A  6/2014
JP  S63211837 A  9/1988
(Continued)

OTHER PUBLICATIONS

Kim J. et al., "Design of an Interconnect Architecture and Signaling Technology for Parrallelism in Communication," IEEE Transactions on Very Large Scale Integration (VLSI) Systems, vol. 15, No. 8, Aug. 2007, pp. 881-894.
(Continued)

*Primary Examiner* — Scott C Sun
(74) *Attorney, Agent, or Firm* — W&T/Qualcomm

(57) ABSTRACT

Unified systems and methods for interchip and intrachip node communication are disclosed. In one aspect, a single unified low-speed bus is provided that connects each of the chips within a computing device. The chips couple to the bus through a physical layer interface and associated gateway. The gateway includes memory that stores a status table summarizing statuses for every node in the interface fabric. As nodes experience state changes, the nodes provide updates to associated local gateways. The local gateways then message, using a scout message, remote gateways with information relating to the state changes. When a first node is preparing a signal to a second node, the first node checks the status table at the associated local gateway to determine a current status for the second node. Based on the status of the second node, the first node may send the message or take other appropriate action.

17 Claims, 14 Drawing Sheets

(56) References Cited

U.S. PATENT DOCUMENTS

| | | |
|---|---|---|
| 6,173,350 B1 | 1/2001 | Hudson et al. |
| 6,247,161 B1 | 6/2001 | Lambrecht et al. |
| 6,714,994 B1 | 3/2004 | Keller et al. |
| 6,791,949 B1 * | 9/2004 | Ryu .................... H04W 84/18 370/254 |
| 7,191,271 B2 | 3/2007 | Andre |
| 7,409,473 B2 | 8/2008 | Conley et al. |
| 7,464,225 B2 | 12/2008 | Tsern |
| 7,751,850 B2 | 7/2010 | Karaoguz |
| 7,945,721 B1 | 5/2011 | Johnsen et al. |
| 7,996,715 B2 | 8/2011 | Rebmann et al. |
| 8,140,835 B2 | 3/2012 | Kochar et al. |
| 8,359,367 B2 | 1/2013 | Chen et al. |
| 8,824,295 B2 | 9/2014 | Boucard |
| 9,009,350 B2 | 4/2015 | Archer et al. |
| 2002/0046311 A1 | 4/2002 | Kageyama |
| 2003/0135678 A1 | 7/2003 | Andre |
| 2007/0109015 A1 | 5/2007 | Hanes et al. |
| 2007/0147359 A1 | 6/2007 | Congdon et al. |
| 2009/0307408 A1 | 12/2009 | Naylor |
| 2010/0158005 A1 | 6/2010 | Mukhopadhyay et al. |
| 2011/0133826 A1 | 6/2011 | Jones et al. |
| 2012/0166621 A1 | 6/2012 | Sharma et al. |
| 2013/0195210 A1 | 8/2013 | Swarbrick et al. |
| 2013/0322462 A1 | 12/2013 | Poulsen |
| 2013/0339091 A1 * | 12/2013 | Humay ............. G06Q 30/0203 705/7.32 |
| 2014/0149615 A1 | 5/2014 | Fosse et al. |
| 2014/0149617 A1 | 5/2014 | Chiang et al. |
| 2015/0120826 A1 | 4/2015 | Gauweiler et al. |
| 2017/0075843 A1 | 3/2017 | Wietfeldt et al. |

FOREIGN PATENT DOCUMENTS

| | | |
|---|---|---|
| JP | H0278343 A | 3/1990 |
| JP | 2009021939 A | 1/2009 |
| WO | 2015077562 A1 | 5/2015 |

OTHER PUBLICATIONS

Invitation to Pay Additional Fees and, Where Applicable, Protest Fee and Partial International Search for PCT/US2016/046728, dated Nov. 11, 2016, 6 pages.

International Search Report and Written Opinion for PCT/US2016/046728, dated Feb. 1, 2017, 18 pages.

Invitation to Restrict or Pay Additional Fees and, Where Applicable, Protest Fee for PCT/US2016/046728, dated Jul. 31, 2017, 2 pages.

Second Written Opinion for PCT/US2016/046728, dated Sep. 13, 2017, 7 pages.

International Preliminary Report on Patentability for PCT/US2016/046728, dated Feb. 19, 2018, 33 pages.

Extended European Search Report for European Patent Application No. 23154234.1, dated May 12, 2023, 9 pages.

* cited by examiner

FIG. 11

| Field Name | Clock | GW/Msg | # of bits | Value | Notes |
|---|---|---|---|---|---|
| Std_or_Scout | Arb | GW | 1 | =1 for Regular Message | 1 - Regular Messgae; 0 - Scout Message. |
| Version | Arb | GW | 1 | 1 | Spec Version |
| Priority Level | Arb | GW/Msg | 3 | Priority Buckets, up to 8 Layers | Part of Arbitration Priority, Priority Level |
| Back-off Bit | Arb | GW/Msg | 1 | Sub-Priority bit | Part of Arbitration Priority, Reduces Starvation |
| Node Sub-ID | Arb | GW/Msg | 5 | Unique Node ID per Priority Level | Part of Arbitration Priority, Unique Value per Level |
| Clock Handover | Arb | GW | 1.5 | | |
| CRC Present | Data | GW | 1 | 1 if CRC Present, 0 if not | When this bit is =1 it indicates that the CRC Field is Present. If =0 then the CRC is not Present. |
| HDR Mode | Data | GW | 2 | Specifies Type of HDR Mode | 0 - not HDR mode; 1- two bits in Parallel on the External Interface |
| Destination Node ID | Data | Msg | 8 | Destination Node ID or Multicast Group ID | The Destination Node or Multicast Group ID that Specifies the Intended Receiver(s) of the Message |
| Length | Data | Msg | 8 | Payload Length | Length of Payload |
| Payload | Data | Msg | 8·Length | Message Payload | The Messsage Payload Field Contains the Number of Bytes Specified by the Message Length Field. |
| CRC | Data | GW | 8 | CRC | CRC-8 Calculated Over The Entire Message |
| Bus Park | Data | GW | 2 | Bus park Field | External Interface Goes to Hi-Z |

UNIFIED SYSTEMS AND METHODS FOR INTERCHIP AND INTRACHIP NODE COMMUNICATION

PRIORITY CLAIM

The present application claims priority to and is a divisional of U.S. patent application Ser. No. 14/850,104 filed on Sep. 10, 2015 and entitled "UNIFIED SYSTEMS AND METHODS FOR INTERCHIP AND INTRACHIP NODE COMMUNICATION," the contents of which is incorporated herein by reference in its entirety.

BACKGROUND

I. Field of the Disclosure

The technology of the disclosure relates generally to structures and methods for facilitating communication between nodes within a computing device.

II. Background

Computing devices have become common in modern society. The prevalence of computing devices is driven in part by the ever increasing array of functions that are enabled on such computing devices. The increased functionality is enabled by faster processors, larger and faster memory elements, and inclusion of specialized integrated circuits (ICs) configured to perform specific tasks. Historically, as a new function or new IC is added to a computing device, a bus is used to allow node(s) associated with the new function to communicate with other nodes of the computing device. The bus may follow the rules of an existing low-speed standard, such as Universal asynchronous receiver/transmitter (UART), Inter-Integrated Circuit (I2C), serial peripheral interface (SPI), or an existing high-speed standard, such as Peripheral Component Interconnect (PCI), PCI express (PCIe), Universal Serial Bus (USB), or the like.

While the existing standards are suitable for certain specific intended purposes, the proliferation of buses operating according to different standards makes device design difficult as the conductive elements for each bus must be routed in such a manner as to comply with certain design criteria and/or made to comply with electromagnetic interference (EMI) emissions limits or electromagnetic compatibility (EMC) standards (e.g., such as those promulgated by the Federal Communications Commission (FCC)). When various plural protocols are used, there may also be a need to support protocol conversions between different protocols. Such conversion requirements add to the complexity of the IC. Communication between nodes may be further complicated by nodes operating according to different sleep/wake rules set by different standards. Clock signals may be sent over each bus, which may increase difficulty in complying with the EMI emissions limits or the EMC standards. Still further, if an IC is coupled to multiple buses, the IC may have different interfaces, one for each coupling. Such interfaces may be duplicative within the computing device, consume space within the IC, and make design of computing devices difficult. Even when the buses are internal to the IC (e.g., a system network on chip (SNOC)), there may be requirements for multiple physical and protocol layers, each of which adds to the design complexity.

Even if a designer is able to reconcile the competing requirements for inclusion of the various buses in the computing device, the designer is still faced with the difficulty of reconciling intrachip communication with interchip communication. Even if the designer is able solve the problems of routing both intrachip and interchip communication and the problems of controlling EMI, the problems of making sure the various elements are awake to receive the communication remain. Accordingly, there remains a need for a consistent node-to-node communication system that allows reliable communication between nodes within a single IC as well as between nodes on separate ICs.

SUMMARY OF THE DISCLOSURE

Aspects disclosed in the detailed description include unified systems and methods for interchip and intrachip node communication. In an exemplary aspect, a single unified low-speed bus, sometimes referred to as an external bus or interchip bus, is provided that connects each of the chips within a computing device. The chips couple to the bus through a physical layer interface and associated gateway. The gateway includes memory that stores a status table summarizing statuses for every node in the interface fabric. The status table is initially populated at system initialization. As nodes experience state changes, the nodes provide updates to associated local gateways. The local gateways then message, using a scout message, remote gateways with information relating to the state changes. In this fashion each gateway has an updated status table to which reference can be made relating to the status of any node in the network. When a first node is preparing a signal to a second node, the first node checks the status table at the associated local gateway to determine a current status for the second node. Based on the status of the second node, the first node may send the message, hold the message, send with a wake command, or take other appropriate action. By consolidating all low-speed buses into a single unified bus with a single unified physical layer interface, space within integrated circuits (ICs) of the computing device is not used for duplicative physical layer interfaces, unnecessarily duplicative conductive elements are not required to connect the ICs, and layout design is simplified. Still further, fewer buses means that fewer clock signals are required, which means that power consumption may be reduced. Design is likewise simplified by eliminating the need to support various interface blocks. Still further, software uniformity is ensured in contrast to heterogeneous systems where different software and/or bridge software is often needed to send a message between nodes.

Exemplary aspects of the present disclosure allow for the bus to be reinitialized through manipulations of an arbitration process in situations where a gateway detects inconsistent behavior in messages received. That is, when the gateway detects events that are in conflict with the gateway's internal state, the gateway sends a special arbitration identifier during the next arbitration cycle to guarantee the gateway wins arbitration. After winning the arbitration, the gateway then sends no data, which forces a reset timeout. The reset timeout forces a re-initialization, which allows the status tables to be repopulated and message traffic to resume without previously detected errors.

In this regard in one aspect, a method for populating a status table for network nodes within a computing device is provided. The method includes activating a first IC coupled to a bus. The method also includes registering first nodes associated with the first IC with a first gateway. The method also includes populating a first status table at the first gateway with information about the first nodes associated with the first IC. The method also includes permitting intrachip communication between the first nodes associated with the first IC based on availability as indicated in the first status table.

In another aspect, a method for populating a status table for network nodes within a computing device is provided. The method includes coupling a first IC with first nodes to a bus within a computing device. The method also includes coupling a second IC with second nodes to the bus within the computing device. The method also includes receiving, from a first gateway associated with the first IC, status and configuration information relating to the first nodes. The method also includes populating, with the status and configuration information relating to the first nodes, a status table at a second gateway associated with the second IC.

In another aspect, a method for updating a status table for network nodes within a computing device is provided. The method includes, at a first gateway in a first IC, receiving a state change indication from a first node in the first IC. The method also includes, in response to the state change indication, updating a first status table at the first gateway to reflect a state change of the first node. The method also includes generating a scout message to a second gateway in a second IC, wherein the scout message indicates the state change of the first node.

In another aspect, a method for updating a status table for network nodes within a computing device is provided. The method includes, at a first gateway in a first IC, receiving a scout message from a second gateway in a second IC, wherein the scout message indicates a state change of a node in the second IC. The method also includes, in response to the scout message, updating a first status table at the first gateway to reflect the state change of the node.

In this regard in one aspect, an IC is provided. The IC includes a node. The node includes a transmitter and a receiver. The IC also includes a gateway. The gateway includes an external interface configured to be coupled to a bus and communicate thereover through a first protocol. The gateway also includes an internal interface communicatively coupled to the node and configured to communicate therebetween through the first protocol.

In another aspect, an IC is provided. The IC includes a first node. The IC also includes a second node. The IC also includes a gateway. The gateway includes an external interface configured to couple to a bus and operative to control information from the first node and the second node. The IC also includes common circuitry that communicatively couples the first node and the second node to the gateway.

In another aspect, a computing system is provided. The computing system includes a first IC. The first IC includes a first node. The first node includes a first transmitter and a first receiver. The first IC also includes a first gateway. The first gateway includes a first external interface. The first gateway also includes a first internal interface communicatively coupled to the first node and configured to communicate therebetween through a first protocol. The computing system also includes a second IC. The second IC includes a second node. The second node includes a second transmitter and a second receiver. The second IC also includes a second gateway. The second gateway includes a second external interface. The second gateway also includes a second internal interface communicatively coupled to the second node and configured to communicate therebetween through the first protocol. The computing system also includes a bus coupled to the first gateway of the first IC and the second gateway of the second IC and configured to carry signals therebetween using the first protocol.

In this regard in one aspect, an IC is provided. The IC includes a node. The IC also includes a gateway communicatively coupled to the node. The gateway includes an interface configured to be coupled to a bus. The gateway also includes a look-up table configured to store data relating to availability of nodes associated with the bus. The IC also includes a control system operatively coupled to the node and the gateway. The control system is configured to receive a status update relating to a state of the node. The control system is also configured to send information relating to the state of the node to other gateways associated with the bus to promote reliability between node-to-node communication.

In another aspect, a method for facilitating node-to-node communication is provided. The method includes receiving a status update from a local node at a gateway. The method also includes broadcasting the status update to remote gateways.

In an exemplary aspect, a method of forcing a system reset is disclosed. The method includes, during an arbitration phase, asserting from a gateway a most urgent priority value to win arbitration. The method also includes, after winning the arbitration, sending no data from the gateway to force a bus timeout. The method also includes, in response to the bus timeout, initiating a system reset.

In another exemplary aspect, an IC is disclosed. The IC includes a gateway. The gateway includes a bus interface configured to couple to a bus. The gateway further includes a control system. The control system is configured to, during an arbitration phase, assert a most urgent priority value on the bus to win arbitration. The control system is further configured to, after winning the arbitration, send no data on the bus to force a bus timeout. The control system is further configured to, in response to the bus timeout, initiate a system reset.

BRIEF DESCRIPTION OF THE FIGURES

FIG. 11 is a table illustrating structure of a standard message according to exemplary aspects of a protocol of the present disclosure;

DETAILED DESCRIPTION

Figure 1:
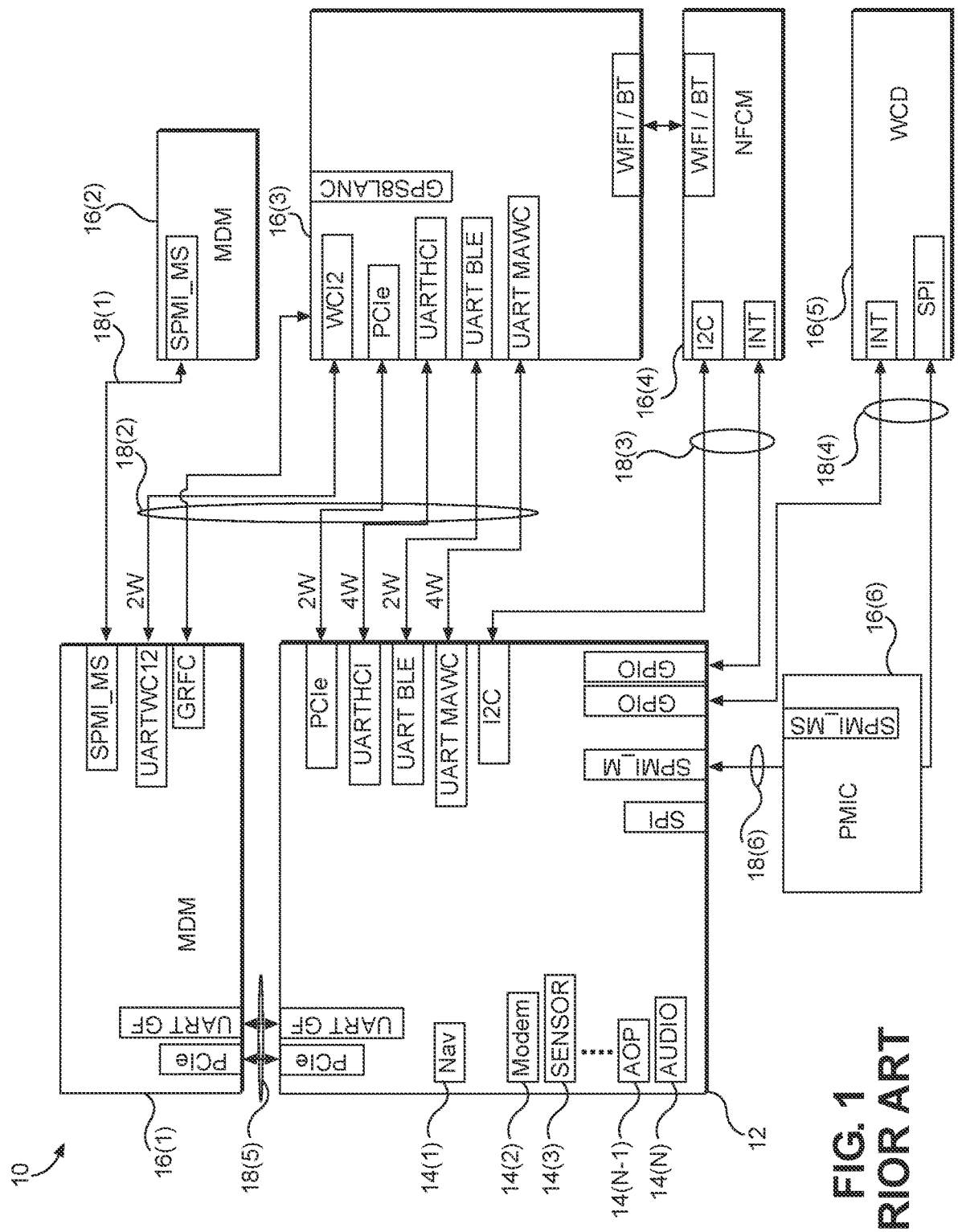
FIG. 1 is a block diagram of an exemplary conventional computing system with multiple communication buses and plural protocols for chip-to-chip communication.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for interchip and intrachip node communication. In an exemplary aspect, a single unified low-speed bus, sometimes referred to as an external bus or an interchip bus, is provided that connects each of the chips within a computing device. The chips couple to the bus through a physical layer interface and associated gateway. The gateway includes memory that stores a status table summarizing statuses for every node in the interface fabric. The status table is initially populated at system initialization. As nodes experience state changes, the nodes provide updates to associated local gateways. The local gateways then message, using a scout message, remote gateways with information relating to the state changes. In this fashion each gateway has an updated status table to which reference can be made relating to the status of any node in the network. When a first node is preparing a signal to a second node, the first node checks the status table at the local associated gateway to determine a current status for the second node. Based on the status of the second node, the first node may send the message, hold the message, send with a wake command, or take other appropriate action. By consolidating all the low-speed buses into a single unified bus with a single unified physical layer interface, space within the integrated circuits of the computing device is not used for duplicative physical layer interfaces, unnecessarily duplicative conductive elements are not required to connect the integrated circuits, and layout design is simplified. Still further, fewer buses means that fewer clock signals are required, which means that power consumption may be reduced. Design is likewise simplified by eliminating the need to support various interface blocks. Still further, software uniformity is ensured in contrast to heterogeneous systems where different software and/or bridge software is often needed to send a message between nodes.

Exemplary aspects of the present disclosure allow for the bus to be reinitialized through manipulations of an arbitration process in situations where a gateway detects inconsistent behavior in messages received. That is, when the gateway detects events that are in conflict with the gateway's internal state, the gateway sends a special arbitration identifier during the next arbitration cycle to guarantee the gateway wins arbitration. After winning the arbitration, the gateway then sends no data, which forces a reset timeout. The reset timeout forces a re-initialization, which allows the status tables to be repopulated and message traffic to resume without previously detected errors.

Before addressing exemplary aspects of the present disclosure, a brief overview of a conventional computing system 10 is provided with reference to FIG. 1. The overview of the conventional computing system 10 is provided to help contrast exemplary aspects of the present disclosure and illustrate shortcomings of conventional systems. Discussion of exemplary aspects of the present disclosure begins below with reference to FIG. 2.

In this regard, FIG. 1 is a block diagram of the conventional computing system 10, which includes a first IC 12, which may be an application processor (sometimes referred to herein as an "AP"). The first IC 12 may include plural subsystems 14(1)-14(N), which may include navigation systems, such as global navigation satellite system (GNSS) (sometimes referred to herein as "Nav"), modems, such as a cellular modem for 3G, 4G, and/or long term evolution (LTE), sensor subsystems, Always On Processor (AOP) subsystems, audio subsystems, and the like. It should be appreciated that each subsystem of the plural subsystems 14(1)-14(N) may have a node (not illustrated) associated therewith that translates application layer activity of the subsystem to a lower layer in a protocol stack for communication with other nodes. The conventional computing system 10 may further include other ICs 16(1)-16(6). While six other ICs 16(1)-16(6) are illustrated, it should be appreciated that more or fewer other ICs such as the other ICs 16(1)-16(6) may be present within the conventional computing system 10. In an exemplary aspect, other ICs 16(1) and 16(2) are mobile device modems (MDMs) and other IC 16(4) is a near field communication modem (NFCM) such as a WIFI or BLUETOOTH™ system (sometimes referred to as WIFI/BT). Other IC 16(5) may be a wireless codec device such as an audio or voice codec (sometimes referred to as WCD), and other IC 16(6) may be a power management IC (PMIC). It should be appreciated that each of the first IC 12 and the other ICs 16(1)-16(6) may be its own chip mounted on a printed circuit board (PCB) within the conventional computing system 10. Such mounting may be done by inserting pins of the chip into a socket, soldering pins to the PCB, or other techniques as is well understood.

With continued reference to FIG. 1, the first IC 12 communicates with the other ICs 16(1)-16(6) through communication buses 18(1)-18(6). It should be appreciated that each of the communication buses 18(1)-18(6) may include sub-buses operating according to different protocols and having different numbers of wires. For example, communication bus 18(2) includes a two-wire (2 W) Peripheral Component Interconnect (PCI) express (PCIe) bus, a four-wire (4 W) Universal asynchronous receiver/transmitter (UART) host controller interface (UARTHCI) bus, a two-wire UART BLUETOOTH Low Energy (UART BLE) bus, and a four-wire UART mobility/mobile assisted wireless-fidelity (WiFi) connectivity (UART MAWC) bus. Other buses may conform to the system power management interface (SPMI) standard, the general purpose input/output (GPIO) standard, the serial peripheral interface (SPI) standard, the UART GeoFencing (UART GF), UART wireless connectivity interface, version 2 (UARTWCI2), or other standards. For each bus and/or sub-bus, the chips may need separate interfaces, which may be duplicative. It should be appreciated that routing each of the communication buses 18(1)-18(6) with all of the sub-buses can be complicated. Further, each wire of each bus requires a pin or contact point, which rapidly becomes commercially impractical. Still further, each of these communication buses 18(1)-18(6) may act as an electromagnetic interference (EMI) aggressor or be an EMI victim, which adds to the complexity of routing the communication buses 18(1)-18(6). In short, the conventional computing system 10 may be improved.

In this regard, exemplary aspects of the present disclosure consolidate low-speed buses within a computing system into a single low-speed bus and implement a protocol that allows node-to-node communication both at an intrachip level and an interchip level. Such consolidation simplifies routing of the bus, reduces opportunities for EMI, and reduces pin counts on the chips. Further, such consolidation simplifies overall system software by having subsystem nodes and their corresponding control software adhere to a single common application programming interface (API) as opposed to the requirements for many APIs in heterogeneous systems.

Figure 2:
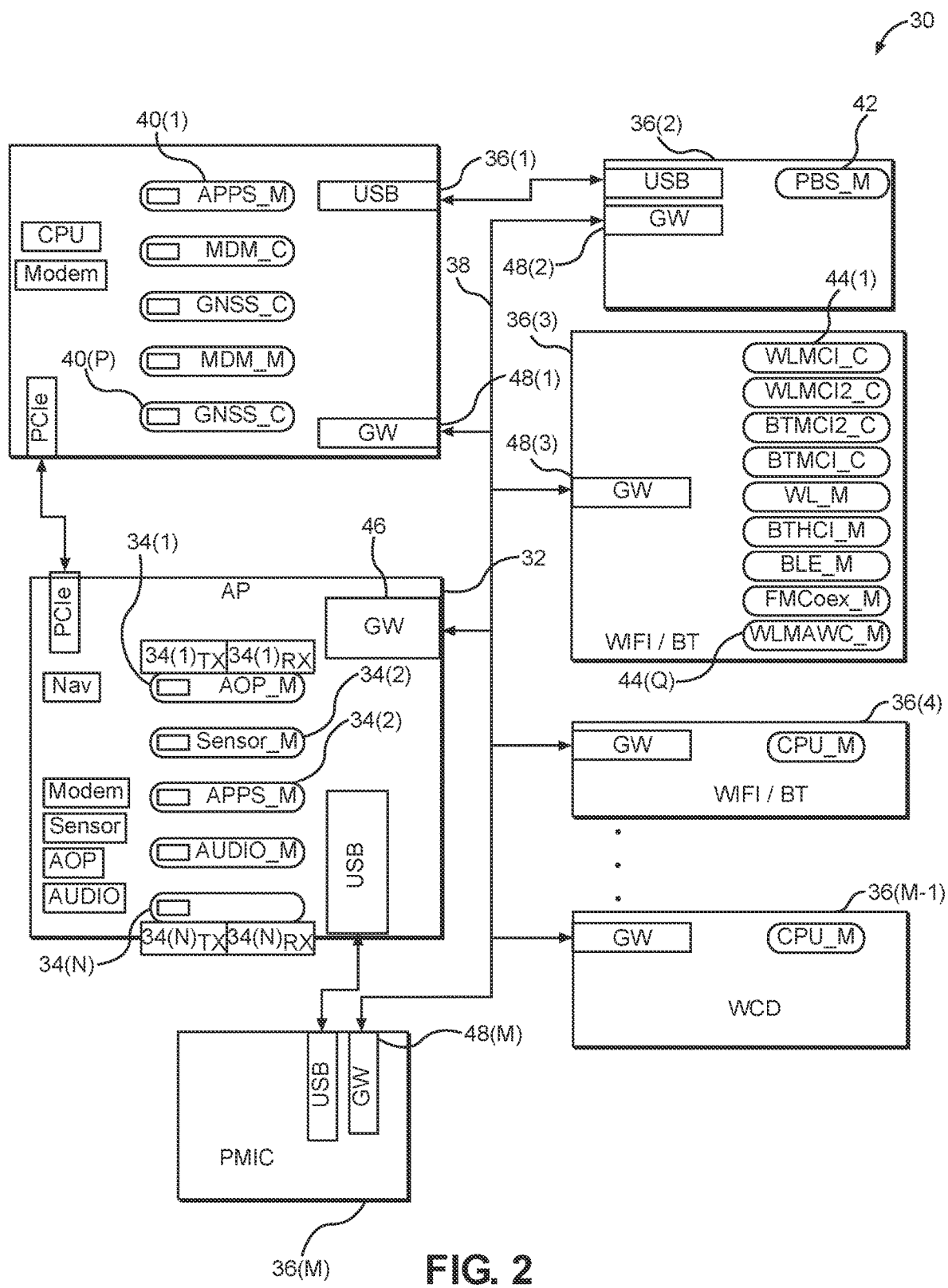
FIG. 2 is a block diagram of an exemplary computing system with a single external bus according to an exemplary aspect of the present disclosure.

In this regard, FIG. 2 illustrates an exemplary computing system 30 with a first IC 32, which may be an application processor. The first IC 32 may include plural subsystems (shown as rectangles, but not numerically labeled). As noted above, the subsystems may include navigation subsystems, modem subsystems, sensor subsystems, audio subsystems, AOP subsystems, and the like. Each of the plural subsystems has an associated node. Thus, the first IC 32 has nodes 34(1)-34(N). It should be appreciated that the nodes 34(1)-34(N) have respective transmitters $34(1)_{Tx}$-$34(N)_{Tx}$ and respective receivers $34(1)_{Rx}$-$34(N)_{Rx}$. The computing system 30 may further include other ICs 36(1)-36(M) (six illustrated). An external bus 38 couples the first IC 32 and the other ICs 36(1)-36(M). In an exemplary aspect the external bus 38 is a low speed bus. Other IC 36(1) has nodes 40(1)-40(P) therein, other IC 36(2) has a node 42 therein, while other IC 36(3) has plural nodes 44(1)-44(Q) therein. Still other ICs of the other ICs 36(1)-36(M) may have various numbers of nodes (not labeled explicitly, but illustrated) therein. Again, it should be appreciated that each of the nodes 40(1)-40(P), 42, and 44(1)-44(Q) has its own respective transmitter and receiver (not shown). The first IC 32 includes a gateway 46 (also labeled "GW" in the Figures). The gateway 46 includes an internal interface that is coupled to the nodes 34(1)-34(N) and an external interface that is coupled to the external bus 38. Similarly, the other ICs 36(1)-36(M) include respective gateways 48(1)-48(M) (also referred to as "GW" in the Figures) that are similar to the gateway 46. While other buses such as a USB and PCIe bus may remain, in general, these are high-speed buses. As used herein, low-speed buses are buses having speeds up to 50-100 Mbps. In contrast, high-speed buses are in the 100s to 1000s of Mbps or Gbps. In an exemplary aspect, the frequency of the external bus 38 may be 57.6 MHz, which is a multiple of the common 19.2 MHz found in many cellular designs and qualifies as a low-speed bus.

Figure 3:
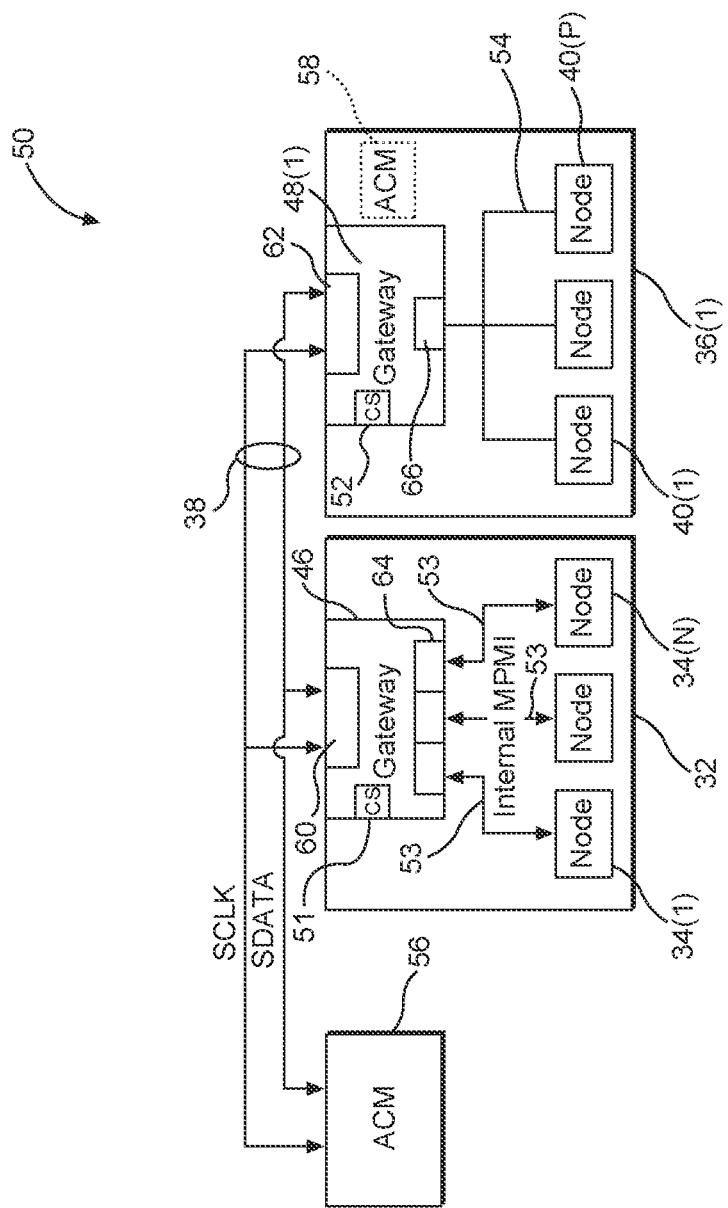
FIG. 3 is a simplified block diagram of a first chip with plural nodes coupled to a second chip with plural nodes.

To better illustrate certain features of the nodes and gateways, FIG. 3 provides a simplified block diagram of a partial computing system 50 extracted from the computing system 30 of FIG. 2. The partial computing system 50 includes the first IC 32, having a control system 51 (labeled "CS" in the Figures), the other IC 36(1), having a control system 52 (labeled "CS" in the Figures), and the external bus 38 coupling the first IC 32 and the other IC 36(1). The external bus 38 may be a two-wire bus capable of carrying a clock signal (SCLK) on a first wire and a data signal (SDATA) on a second wire. The gateway 46 of the first IC 32 is coupled directly by point-to-point coupling 53) to the nodes 34(1)-34(N). As used herein such direct coupling is defined to include one-to-one physical connections. While active and passive elements may be present between a given node of the nodes 34(1)-34(N) and the gateway 46, the connection does not communicatively connect to any other node of the nodes 34(1)-34(N) in the first IC 32 without passing through the gateway 46. In contrast, the nodes 40(1)-40(P) of the other IC 36(1) are coupled to gateway 48(1) indirectly such as through a network on chip (NoC) 54. While FIG. 3 illustrates the first IC 32 with the point-to-point coupling 53 and the other IC 36(1) with the NoC 54, in an exemplary aspect, these systems are mutually exclusive. That is, if the first IC 32 has the point-to-point coupling 53, then the other IC 36(1) would likewise have the point-to-point coupling 53 rather than the NoC 54. Likewise, if the other IC 36(1) had the NoC 54, the first IC 32 would likewise have the NoC 54. Note also that while as illustrated the control systems 51 and 52 are internal to the respective gateways 46 and 48(1), the present disclosure is not so limited, and the control systems 51 and 52 may be outside the respective gateways 46 and 48(1).

With continued reference to FIG. 3, the external bus 38 may couple the first IC 32 and the other IC 36(1) to an arbitration clock manager (ACM) 56. Alternatively, an ACM 58 may be present in the other IC 36(1) (or another IC such as the first IC 32). The function of the ACM 56 or the ACM 58 is to source the SCLK for the external bus 38 during an arbitration period. As noted above, the gateways 46 and 48(1) include respective external interfaces 60 and 62 to couple to the external bus 38. Likewise, the gateway 46 may include an internal interface 64 to couple to the nodes 34(1)-34(N). The internal interface 64 may be a unitary element or plural elements as needed or desired. Similarly, the gateway 48(1) may include an internal interface 66 that couples to the NoC 54. In an exemplary aspect, the internal interface 64 may have a set of ports that connect to the internal nodes 34(1)-34(N). Each port has a set of port logical ID registers so that a node of the nodes 34(1)-34(N) can respond to more than one logical node ID. An exemplary port table contains registers defining status for the following conditions: reliable, online, wakeable, maximum transmission unit (MTU), and clear to send (CTS). Note that reliability may be a function of individual logical modes, but the gateway could provide a common set of parameters for all logical nodes in the port (e.g., online, wakeable, MTU, CTS). Different implementations may partition the attributes differently.

Figure 4:
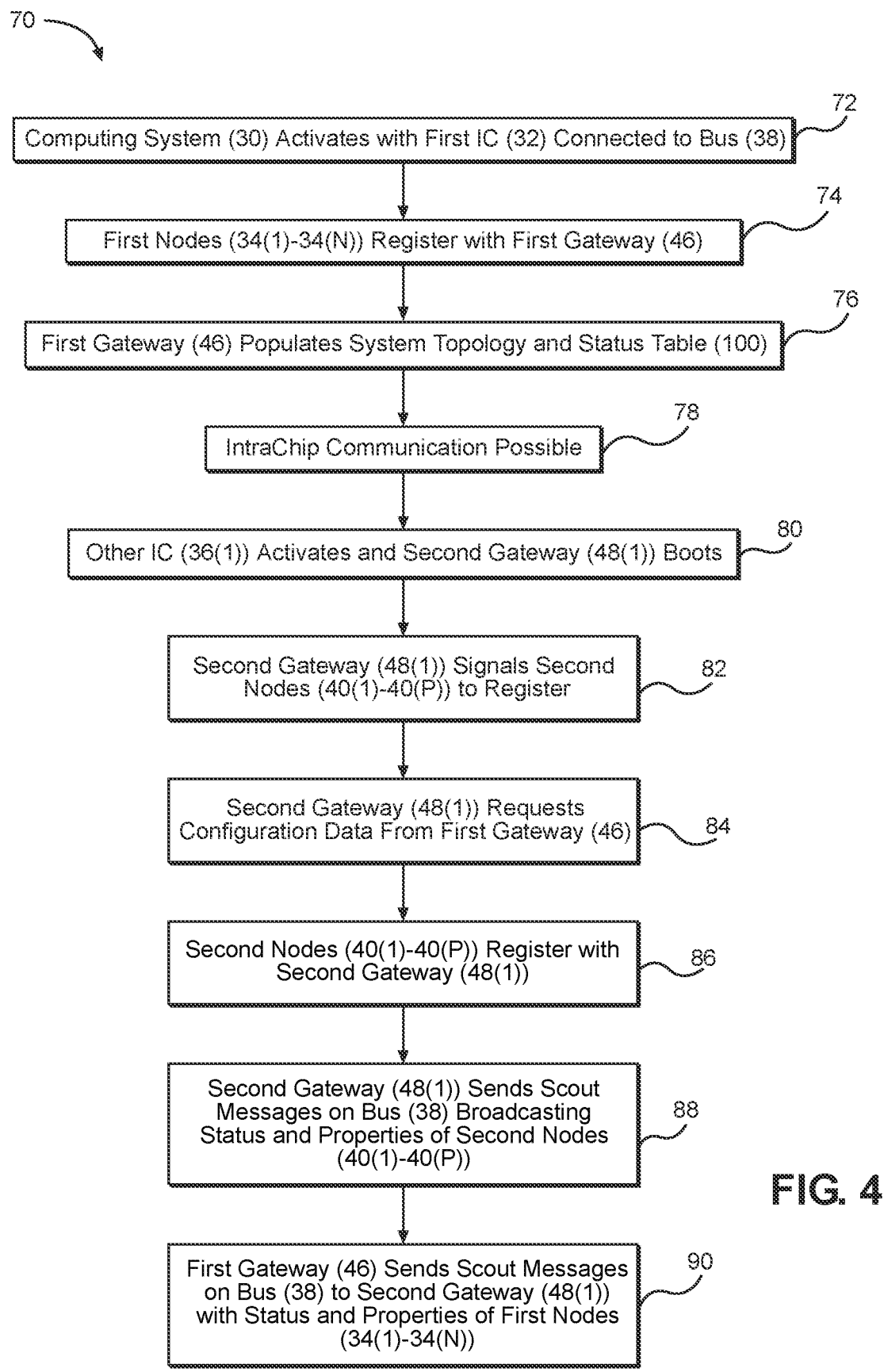
FIG. 4 is a flowchart illustrating population of a system topology and status table in a gateway during initialization of the computing system of FIG. 2.

FIG. 4 is a flowchart illustrating population process 70 of a system topology and status table 100 (see FIG. 5) in a gateway (e.g., the gateway 46 or one of the gateways 48(1)-48(P)) during initialization of the computing system 30 of FIG. 2. The process 70 begins with the computing system 30 activating with the first IC 32 connected to the external bus 38 (block 72). The first nodes 34(1)-34(N) register with the first gateway 46 (block 74). This registration may be done in response to a solicitation from the gateway 46, in response to the nodes 34(1)-34(N) receiving power, or from another command as is readily understood. The first gateway 46 populates the system topology and status table 100 (see FIG. 5) (block 76) with information about the nodes 34(1)-34(N). At this point in time, intrachip communication (i.e., between the nodes 34(1)-34(N)) is possible (block 78), but the gateway 46 precludes interchip communication.

With continued reference to FIG. 4, at some later time, one or more of the other ICs 36(1)-36(M) are activated. For the purposes of illustration, the other IC 36(1) is activated and the second gateway 48(1) boots (block 80). Note that as used herein, first and second are used for convenience in discriminating between the elements and are not necessarily strict temporal labels. For example, it is possible that other IC 36(3) could activate at a first time with the IC 32 subsequently activating, and thus, the other IC 36(3) could be "first" for the process 70. Still other temporal orders are possible as is readily understood. The second gateway 48(1) signals the second nodes 40(1)-40(P) to register (block 82). The second gateway 48(1) requests configuration data of the nodes 34(1)-34(N) associated with the first gateway 46 from the first gateway 46 (block 84). The second nodes 40(1)-40(P) register with the second gateway 48(1) (block 86), and the second gateway 48(1) populates its own system topology and status table. Note that while in an exemplary aspect of the present disclosure the ICs 32 and 36(1)-36(M) are configured independently of one another, in another exemplary aspect, the first gateway 46 may configure the second gateway 48(1).

With continued reference to FIG. 4, the second gateway 48(1) sends scout messages on the external bus 38 broadcasting the status and properties of the second nodes 40(1)-40(P) (block 88). More information about scout messages is provided below with reference to FIG. 8. The first gateway 46 updates the local system topology and status table with the information about the second nodes 40(1)-40(P). The first gateway 46 sends scout messages on the external bus 38 to the second gateway 48(1) with the status and properties of the first nodes 34(1)-34(N) (block 90). The second gateway 48(1) updates the local system topology and status table with the information about the first nodes 34(1)-34(N). Once the system topology and status tables are updated with the information about the remote nodes, interchip communication may occur according to availability of the nodes involved in the communication as is explained in greater detail below with reference to FIGS. 9 and 10.

Figure 5:
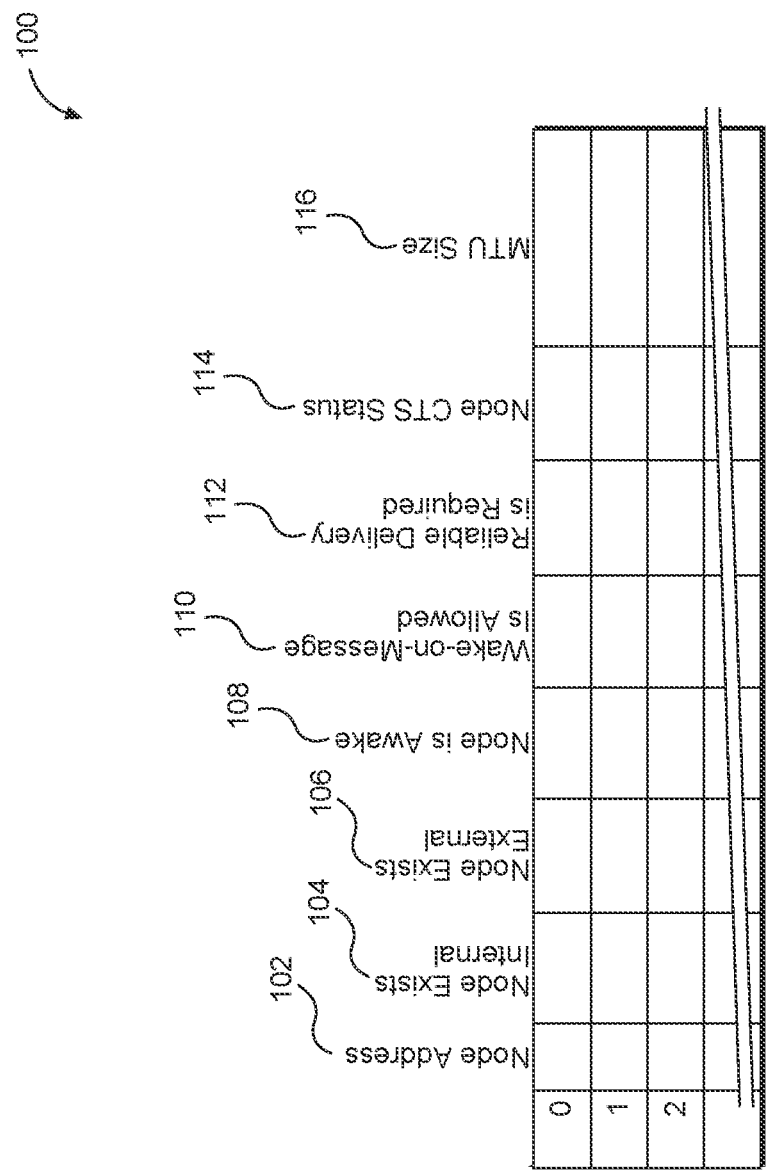
FIG. 5 is an exemplary system topology and status table according to an exemplary aspect of the present disclosure.

FIG. 5 is an exemplary system topology and status table 100 according to an exemplary aspect of the present disclosure. The system topology and status table 100 may include fields such as: a node address field 102, a node exists internally field 104, a node exists externally field 106, a node is awake field 108, a wake-on-message is allowed field 110, a reliable delivery is required field 112, a node clear to send (CTS) status field 114, and a maximum transmission unit (MTU) size field 116. In exemplary aspects of the present disclosure, the MTU is determined by the system designer for all receive nodes so as not to overflow buffers and similar factors. There is a direct relationship between SOC area and MTU and buffer sizes, in that larger MTU implies larger buffer size and thus, larger SOC area. Note that the fields 104, 106, 108, 110, and 112 may be single bits or simple Y/N indications. The other fields 102, 114, and 116 may be greater than a single bit. Note further that the fields 104 and 106 may be consolidated into a single field that indicates internal or external or relies on the mutually exclusive nature of the location of the nodes to use a single indication to indicate the location of a node and the absence of such indication to infer the other location for nodes lacking the indication (e.g., if only node exists internally field 104 is present, the absence of a positive bit here necessarily indicates that the node exists externally).

Figure 6:
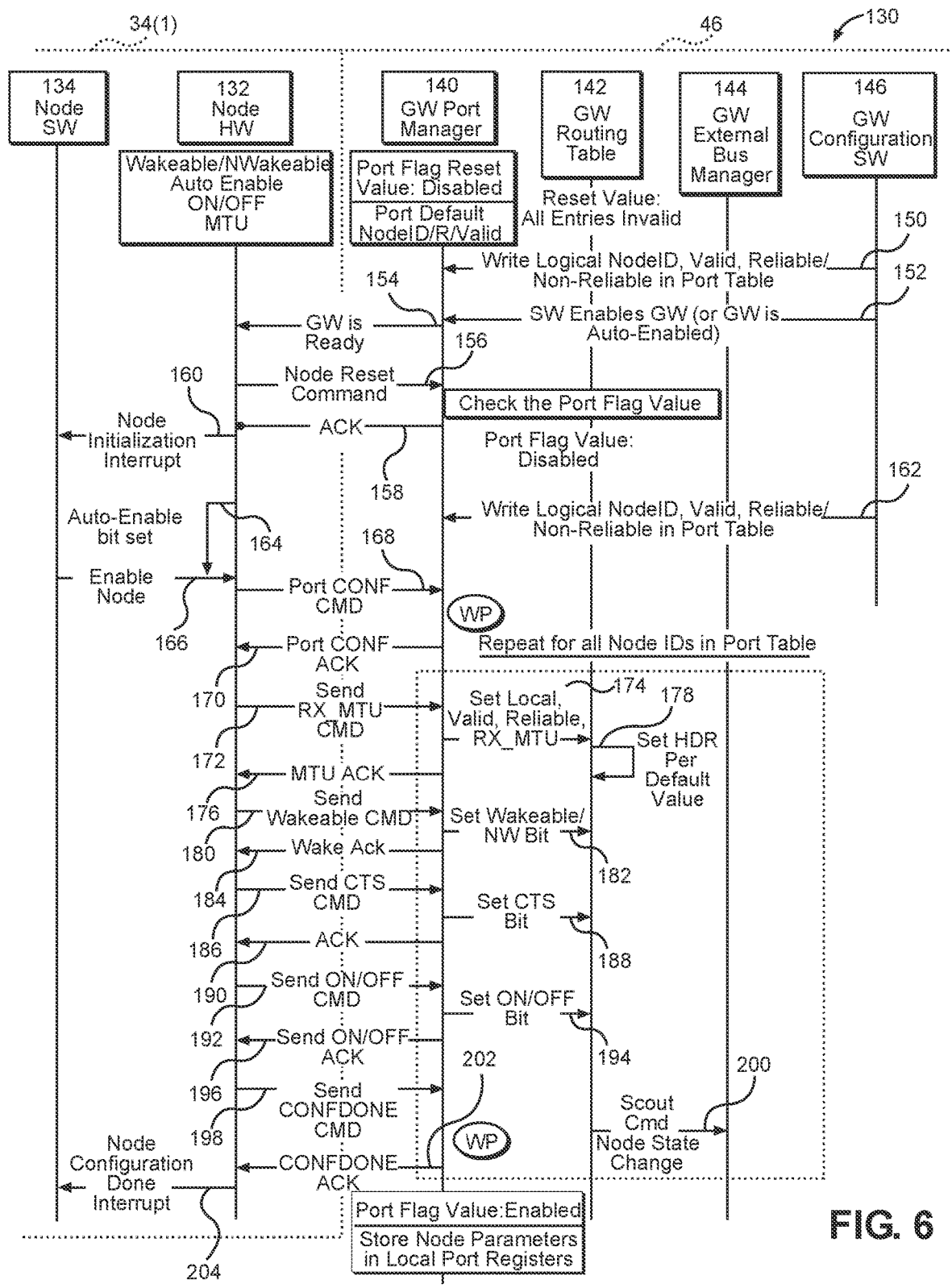
FIG. 6 is a signal flow diagram showing how a node registers with a gateway.

FIG. 6 is a signal flow diagram 130 showing how a node (e.g., node 34(1)) registers with a gateway (e.g., the gateway 46) on a reset or initialization. It should be appreciated that the node 34(1) includes node hardware (HW) 132 and node software (SW) 134. Likewise, the gateway 46 includes a gateway (referenced in drawings as GW) port manager 140, a gateway routing table 142 (e.g., the system topology and status table 100), a gateway external bus manager 144, and a gateway configuration SW 146. Initially, hardware or a software command initiates a reset. The node 34(1) may write a reset condition in a status register (not illustrated). The reset condition may be a cold/subsystem hardware reset, a gateway reset request, a software reset request, or a debug reset. The node 34(1) may test to see if the gateway 46 is ready. Once the gateway 46 is ready, the initialization process of the signal flow diagram 130 begins.

With continued reference to FIG. 6, initially the port table is unlocked and can be modified by the gateway configuration SW 146. The gateway configuration SW 146 writes logical nodeID, Valid, Reliable/Non-Reliable in the port table with signal 150. The gateway configuration SW 146 also enables the gateway 46 with signal 152. Alternatively, the gateway 46 is auto-enabled. The gateway port manager 140 indicates to the node HW 132 that the gateway 46 is ready with signal 154, which causes the node HW 132 to update the gateway read status register (not illustrated). The node HW 132 sends a node reset command 156 to the gateway port manager 140, which checks the port flag value. The port flag value should be set to disabled. The port flag value is used to reset the port and routing tables on a warm reset condition.

With continued reference to FIG. 6, the gateway port manager 140 sends a reset acknowledgment (ACK) 158 to the node HW 132. The node HW 132 sends a node-initialization interrupt 160 to the node SW 134. Meanwhile the gateway configuration SW 146 may write Logical NodeID, Valid, Reliable/Non-Reliable in the port table with signal 162. The gateway configuration SW 146 may be triggered by the node-initialization interrupt 160. The node HW 132 sets the auto-enable bit with command 164. The node SW 134 sends an enable node command 166 to the node HW 132. The node HW 132 sends a port CONF command (sometimes referred to as CMD) 168 to the gateway port manager 140, which responds with a port CONF ACK 170 and locks (write protects or "WP") the port table such that it cannot be modified by the gateway configuration SW 146.

With continued reference to FIG. 6, the node HW 132 sends an RX_MTU CMD 172 to the gateway port manager 140, which sets local, valid, reliable, RX_MTU in the gateway routing table 142 with command 174. The gateway port manager 140 sends an MTU ACK 176 to the node HW 132. Meanwhile, the gateway routing table 142 sets HDR per the default value with command 178. The node HW 132 sends a Wakeable CMD 180 to the gateway port manager 140, which sets the wakeable/not-wakeable (NW) bit in the gateway routing table 142 with command 182. The gateway port manager 140 sends a wake ACK 184 to the node HW 132. The node HW 132 sends a CTS CMD 186 to the gateway port manager 140, which sets the CTS bit in the gateway routing table 142 with command 188. The gateway port manager 140 sends a CTS ACK 190 to the node HW 132. The node HW 132 sends an ON/OFF CMD 192 to the gateway port manager 140, which sets the ON/OFF bit in the gateway routing table 142 with command 194. The gateway port manager 140 sends ON/OFF ACK 196 to the node HW 132. The node HW 132 sends a configuration done (CONFDONE) CMD 198 to the gateway port manager 140. The gateway routing table 142 then sends a scout command 200 with a node state change to the gateway external bus manager 144. The gateway port manager 140 sends a CONFDONE ACK 202 to the node HW 132 and the port table is unlocked and may be modified by the gateway configuration SW 146. The signals and commands 170-202 are repeated for each node ID in the port table. The node HW 132 ends by sending a node configuration done interrupt 204 to the node SW 134.

In an exemplary aspect the port should maintain the state of the node to use in case of a dynamic creation of a logical node ID. This allows the node's state, such as enabled (on line), On/Off, Wake-able, Rx_MTU, and CTS, to inherit the state of the port at the time the logical node ID is created. Note that the logical node ID may be created dynamically by setting or changing the logical node ID value. The port in the gateway keeps track of all possible logical node IDs and their status. As an example, a physical node may have four logical nodes with IDs a, b, c, and d. Changing conditions cause the dynamic creation of a new logical node (and its parameters) at ID e. In so doing, logical node e replaces logical node a. After creation, the gateway list of logical nodes is updated to b, c, d, and e. The parameters of the logical node a may be kept in the node software if desired.

Figure 7:
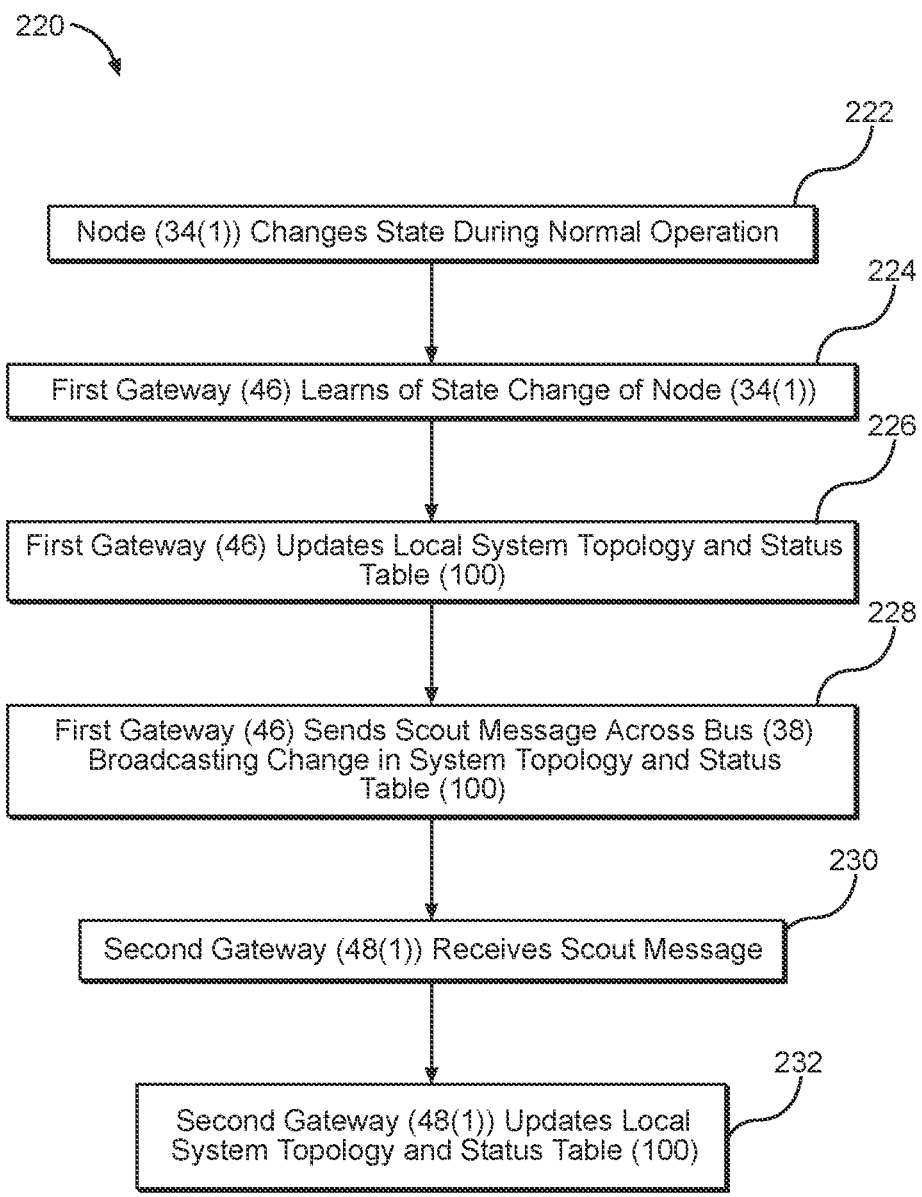
FIG. 7 is a flowchart illustrating updating the system topology and status table of FIG. 5 with scout messages generated by changes in a state of a node.

FIG. 7 is a flowchart illustrating updating the system topology and status table 100 of FIG. 5 with scout messages generated by changes in a state of a node. In particular a process 220 begins with the node 34(1) changing state during normal operation (block 222). For example, the node 34(1) may enter a sleep mode. The first gateway 46 learns of the state change of the node 34(1) (block 224). The node 34(1) may proactively inform the gateway 46 of this state change prior to the state change; the gateway 46 may periodically poll the nodes 34(1)-34(N) for state changes, or other techniques may be used as needed or desired. After learning of the state change, the first gateway 46 updates the local system topology and status table 100 (block 226).

With continued reference to FIG. 7, the first gateway 46 sends a scout message across the external bus 38 broadcasting the change in the local system topology and status table 100 (block 228). The second gateway 48(1) receives the scout message (block 230) and updates its local system topology and status table 100 (block 232).

Figure 8:
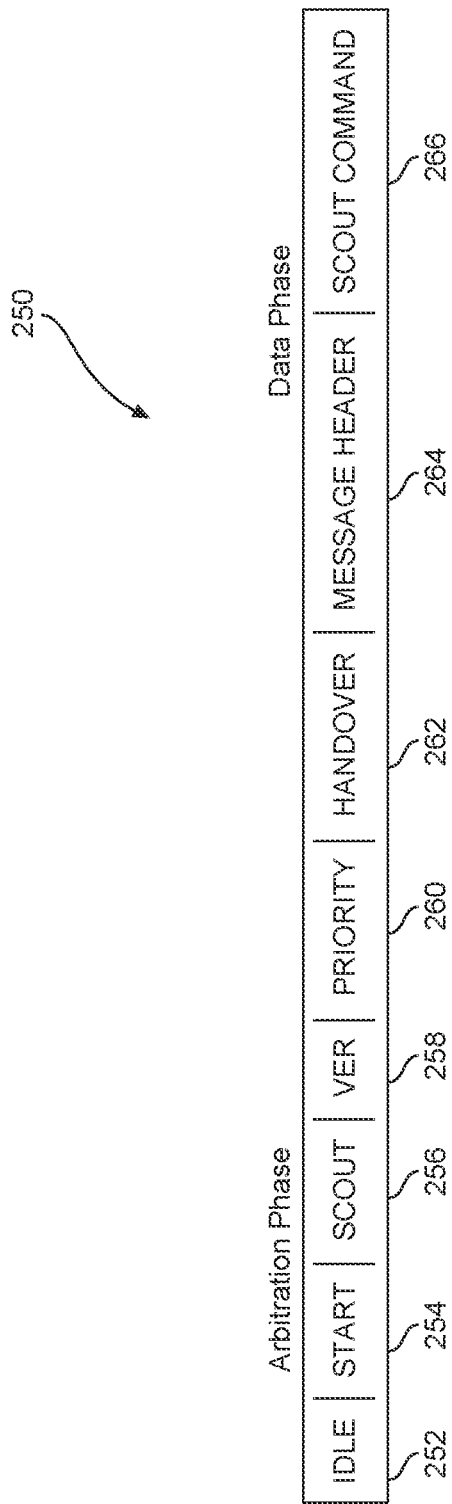
FIG. 8 is an exemplary scout message according to an exemplary aspect of a protocol of the present disclosure.

FIG. 8 is an exemplary scout message 250 according to an exemplary aspect of a protocol of the present disclosure. The scout message 250 may include the following fields: idle field 252, start field 254, scout identifier field 256, version ("ver") field 258, priority field 260, a handover field 262, a message header 264, and one to four scout commands 266 (only one illustrated). The handover field 262 ends the arbitration phase of the scout message 250 and begins the data phase.

Figure 9:
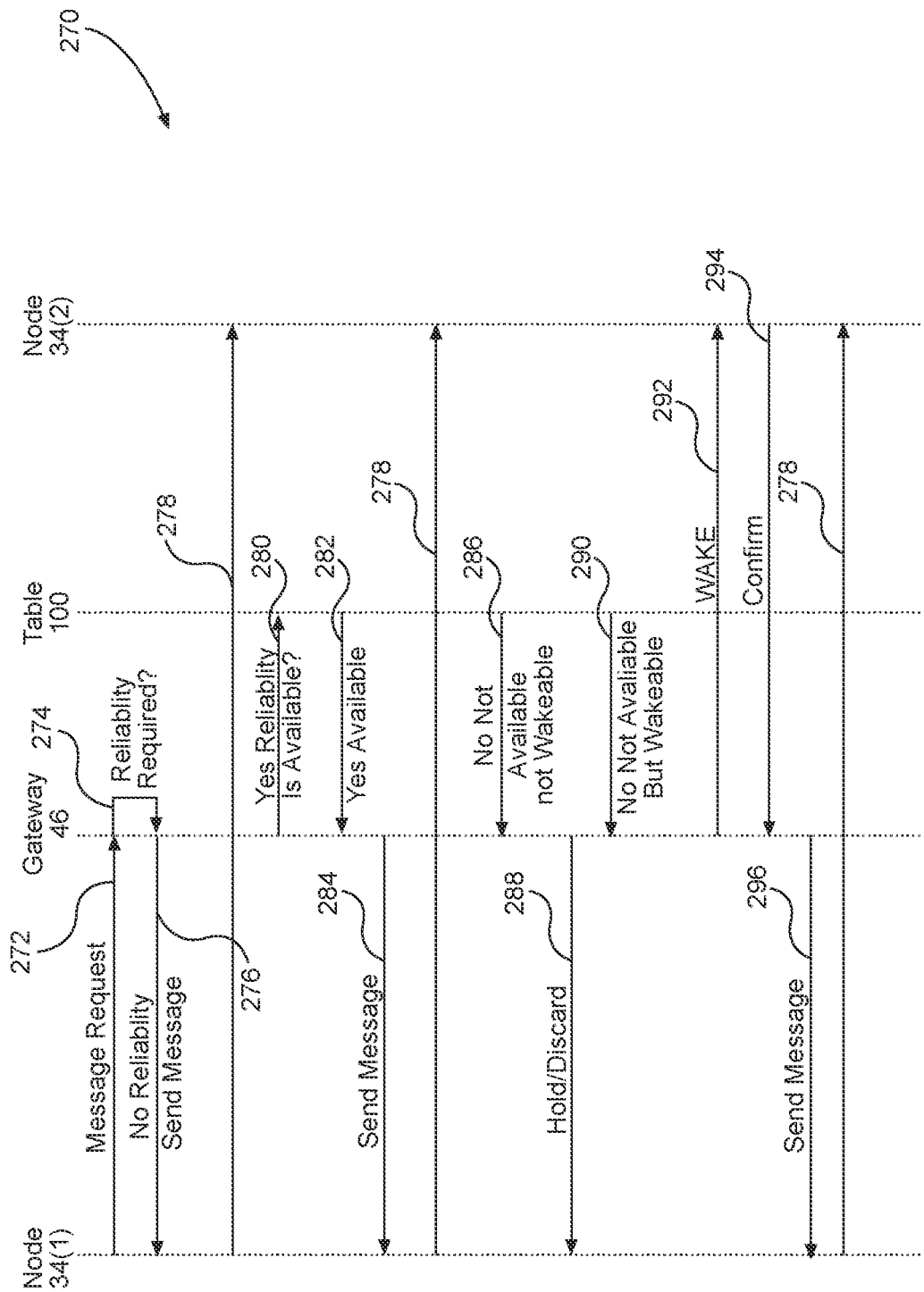
FIG. 9 is a signal diagram of a node communicating with a second node within a chip.

After all the system topology and status tables 100 are populated and updated, the nodes of the computing system 30 of FIG. 2 may communicate with one another to effectuate higher level functions of the computing system 30. In this regard, FIG. 9 is a signal diagram 270 of the node 34(1) communicating with a second node 34(2) within the first IC 32. The node 34(1) sends a message request 272 to the gateway 46. The message request 272 may include attributes such as reliability requirements. The gateway 46 checks if reliability is required (signal 274). If no reliability is required, the gateway 46 instructs the node 34(1) to send the message (signal 276) and the node 34(1) sends the message 278.

With continued reference to FIG. 9, if reliability is required, the gateway 46 checks the system topology and status table 100 to see if the destination node 34(2) is available (signal 280). If the table 100 indicates that the destination node 34(2) is available (signal 282), the gateway 46 instructs the node 34(1) to send the message (signal 284) and the node 34(1) sends the message 278.

With continued reference to FIG. 9, if reliability is required, and the destination node 34(2) is not available and not wakeable (signal 286), then the gateway 46 instructs the node 34(1) to hold or discard the message (signal 288).

With continued reference to FIG. 9, if reliability is required, and the destination node 34(2) is not available, but is wakeable (signal 290), the gateway 46 sends a wake command 292 to the destination node 34(2). The destination node 34(2) sends a confirmation of waking (signal 294), and the gateway 46 instructs the node 34(1) to send the message (signal 296). The node 34(1) sends the message 278.

By checking the system topology and status table 100, reliability is insured in message transfers. Improved reliability allows for conservation of bandwidth in that fewer messages are resent. Such reliability is achieved even if the nodes have different power domains, different clock domains, and/or different wakeability parameters.

Figure 10:
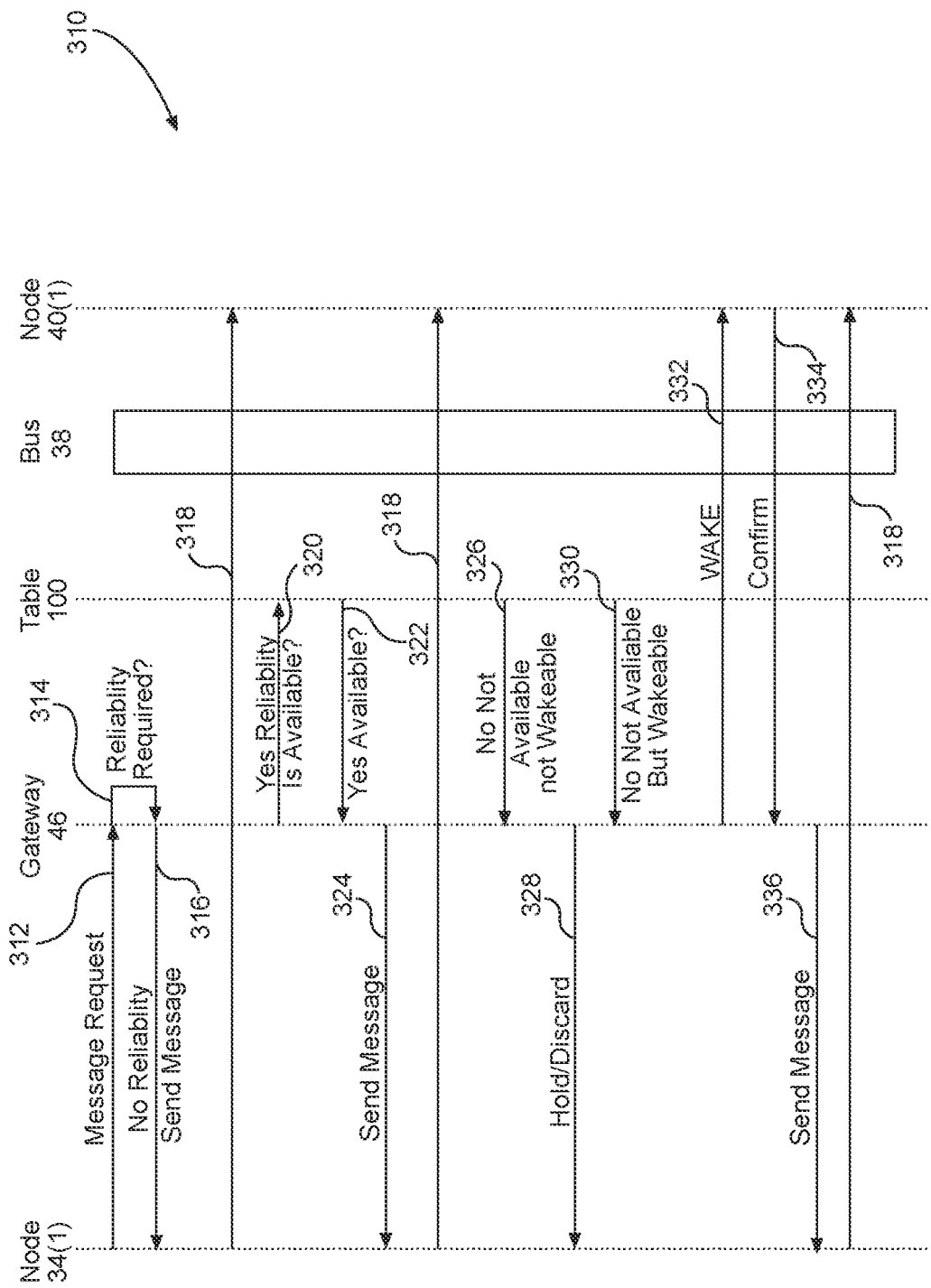
FIG. 10 is a signal diagram of a node communicating with a second remote node.

While the signal diagram 270 discusses intrachip node-to-node communication, FIG. 10 is a signal diagram 310 of the node 34(1) communicating with a second remote node 40(1) on a remote IC such as one of the other ICs 36(1)-36(M). The node 34(1) sends a message request 312 to the gateway 46. The message request 312 may include attributes such as reliability requirements. The gateway 46 checks if reliability is required (signal 314). If no reliability is required, the gateway 46 instructs the node 34(1) to send the message (signal 316) and the node 34(1) sends the message 318 across the external bus 38 to the remote destination node 40(1).

With continued reference to FIG. 10, if reliability is required, the gateway 46 checks the system topology and status table 100 to see if the remote destination node 40(1) is available (signal 320). The table 100 should be current based on the scout messages that have previously been sent to provide the status of all nodes in the computing system 30. If the table 100 indicates that the remote destination node 40(1) is available (signal 322), the gateway 46 instructs the node 34(1) to send the message (signal 324) and the node 34(1) sends the message 318 across the external bus 38 to the remote destination node 40(1).

With continued reference to FIG. 10, if reliability is required, and the remote destination node 40(1) is not available and not wakeable (signal 326), then the gateway 46 instructs the node 34(1) to hold or discard the message (signal 328).

With continued reference to FIG. 10, if reliability is required, and the remote destination node 40(1) is not available, but is wakeable (signal 330), the gateway 46 sends a wake command 332 to the remote destination node 40(1) across the external bus 38. The remote destination node 40(1) sends a confirmation of waking (signal 334) across the external bus 38, and the gateway 46 instructs the node 34(1) to send the message (signal 336). The node 34(1) sends the message 318.

In the interests of helping to explicate the new protocol used on the external bus 38, FIG. 11 is a table 350 illustrating structure of a standard message according to exemplary aspects of a protocol of the present disclosure. The standard message may have fields such as standard or scout (Std_or-_Scout) 352, version 354, priority level 356, back-off bit 358, node sub-ID 360, clock handover 362, cyclic redundancy check (CRC) present 364, HDR mode 366, destination node ID 368, length 370, payload 372, CRC 374, and bus park 376. While other structures and/or arrangements for the standard message are possible, the structure illustrated in FIG. 11 is suitable for exemplary aspects of the present disclosure.

Figure 12:
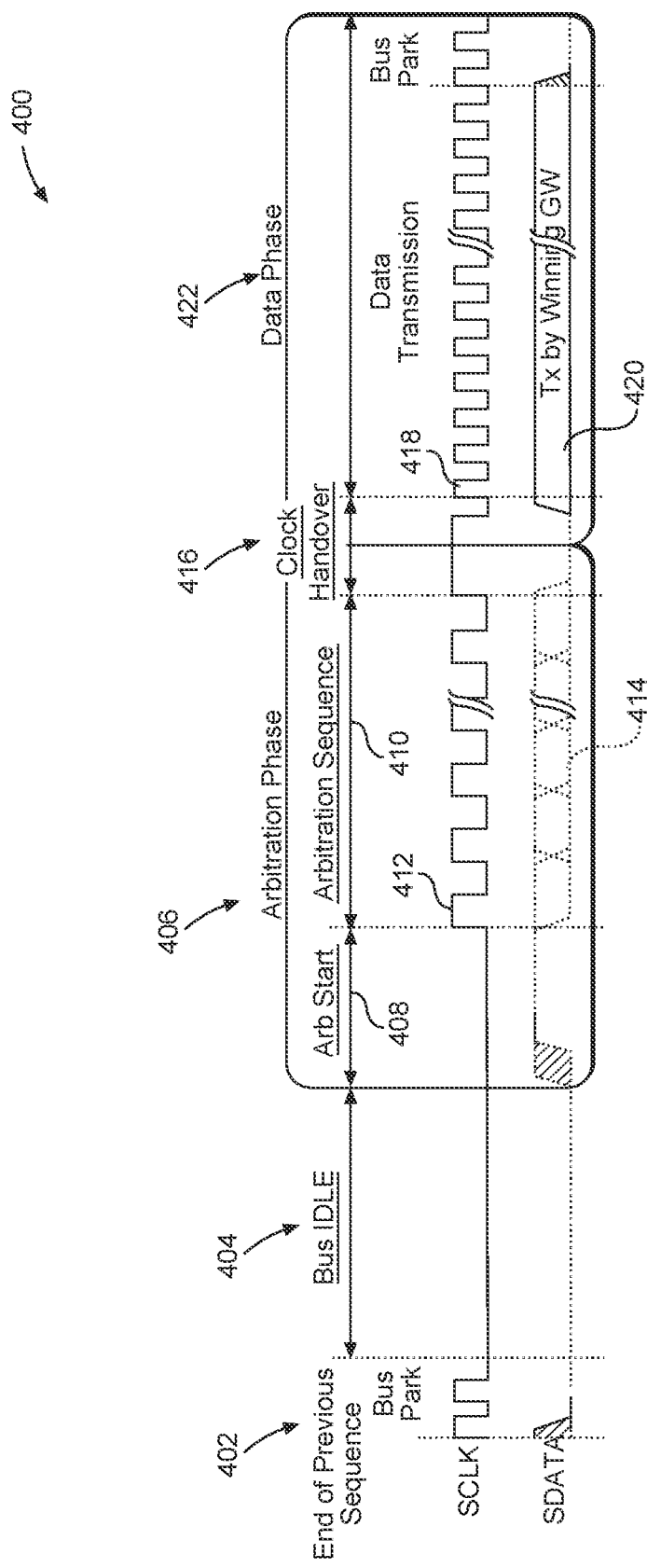
FIG. 12 is a signal diagram of an arbitration process according to an exemplary aspect of the present disclosure.

FIG. 12 is a signal diagram of an arbitration process 400 according to an exemplary aspect of the present disclosure. The arbitration process 400 is provided in the interests of helping to explicate the new protocol used on the external bus 38. While other arbitration processes are possible, the arbitration process 400 is suitable for exemplary aspects of the present disclosure. The arbitration process 400 begins after the end of a previous sequence period 402 and after a bus idle period 404. During the bus idle period 404 the SCLK is dormant as is the SDATA. Arbitration phase 406 starts with arbitration start 408 which begins when one (or more) of the chips initiates a request on the SDATA line. On detection of the message initiation, an arbitration sequence 410 starts, and the ACM 58 drives the SCLK (denoted at 412). The various requesting gateways drive the SDATA according to their respective message priority (generally at 414) and priority is established. Once priority is established, a clock handover period 416 begins, after which the winning gateway drives the SCLK (denoted at 418) and provides the appropriate SDATA (denoted at 420) in a data phase 422.

In the arbitration phase 406, the multiple gateways 46 and 48(1)-48(M) can contend for access to the external bus 38 by transmitting a unique message priority value. The external bus 38 is configured so that when more than one of the gateways 46 and 48(1)-48(M) transmit during the arbitration phase 406, the most urgent priority value overrides the gateways 46 and 48(1)-48(M) with less urgent priority values. To accomplish this priority scheme, the message priority value is transmitted with a most significant bit (MSB) first, and all the gateways 46 and 48(1)-48(M) sense the external bus 38 to confirm that the bit they just output to the external bus 38 is the actual value of the external bus 38. Whenever one of the gateways 46 and 48(1)-48(M) detects a bit value that is not equal to the value the gateway just transmitted, that gateway backs off and does not attempt to transmit subsequent bits of the message priority value. The winning gateway is the gateway that detects all bits of its message priority value were transmitted properly (i.e., the priority bits were not pre-empted by another one of the gateways 46 and 48(1)-48(M)). The winning gateway is granted permission to transmit its message during the data phase 422. After the gateway is finished transmitting its message, the external bus 38 returns to an idle state where any of the gateways 46 and 48(1)-48(M) is able to request access to the external bus 38.

When one of the gateways 46 and 48(1)-48(M) detects a non-recoverable error in its internal state, the gateway can send a unique bus access request that will cause a system-wide reset to occur. The unique bus access request is referred to as a bus error halt sequence. To implement the bus error halt sequence, the most urgent priority value in the arbitration process is reserved for transmitting the bus error halt sequence. In an exemplary aspect, this priority value can be either all-ones or all-zeros, depending on assignment of the message priority values in the computing system 30. The bus error halt sequence can be transmitted by any of the gateways 46 and 48(1)-48(M), and it is permissible for more than one of the gateways 46 and 48(1)-48(M) to transmit the bus error halt sequence simultaneously. It should be appreciated that by using the most urgent priority value for the bus error halt sequence, the gateway(s) 46 and 48(1)-48(M) that does transmit the bus error halt sequence will win the arbitration phase 406. The winning gateway(s) then does not transmit any data in the data phase 422. Because all winning gateway(s) do not transmit any data, there is no contention, even if there is a tie in the arbitration phase 406. The lack of a message in the data phase 422 will eventually trigger a reset timer in each of the gateways 46 and 48(1)-48(M) which causes a system error and causes all the gateways 46 and 48(1)-48(M) to be reset. In an exemplary aspect, the system error is determined at each of the gateways 46 and 48(1)-48(M). The gateways 46 and 48(1)-48(M) may have a second timer which prevents them from restarting until the slowest of the gateways 46 and 48(1)-48(M) has an opportunity to detect the frozen external bus 38 so the slowest of the gateways 46 and 48(1)-48(M) can also declare a reset condition internally.

Figure 13:
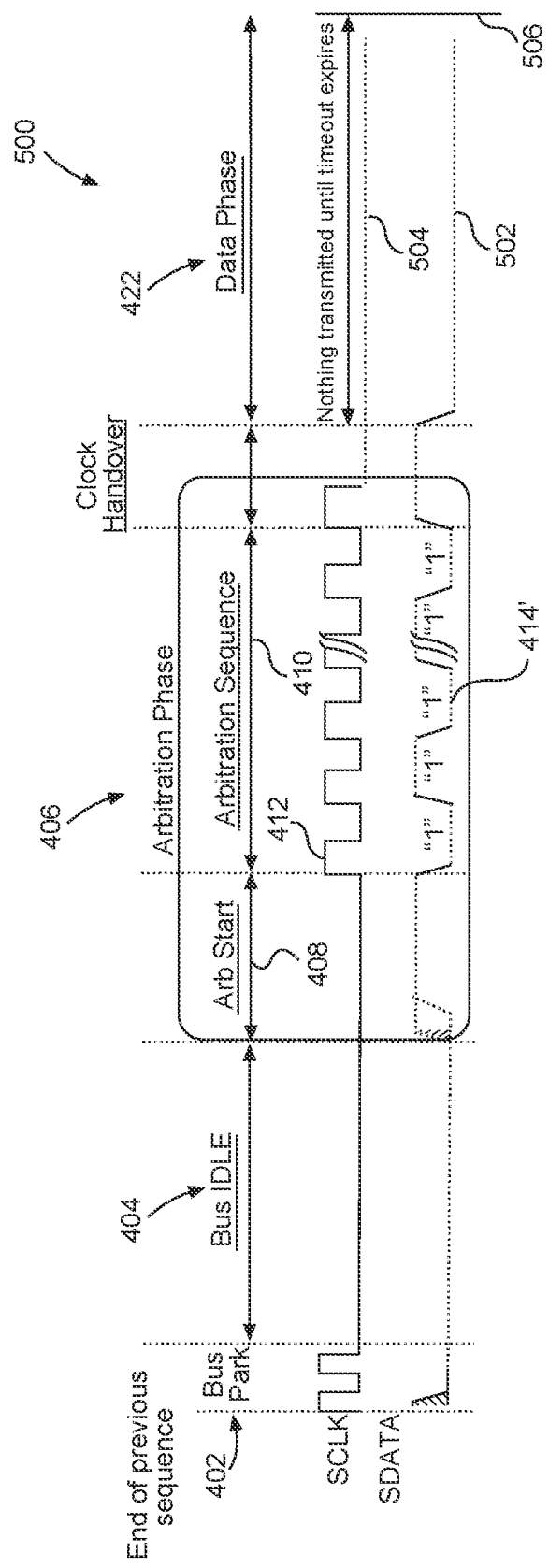
FIG. 13 is an exemplary bus sequence for a bus halt following an arbitration on a bus.

A signal diagram 500 reflecting the system reset just described is provided in FIG. 13. The signal diagram 500 is similar to the signal diagram of the arbitration process 400 of FIG. 12 in that the arbitration process 400 begins after the end of the previous sequence period 402 and after the bus idle period 404. During the bus idle period 404 the SCLK is dormant as is the SDATA. The arbitration phase 406 starts with the arbitration start 408 which begins when one of the chips initiates a message on the SDATA line. On detection of the message initiation, the arbitration sequence 410 starts, and the ACM 58 drives the SCLK (denoted at 412). The requesting gateways assert data 414' on the SDATA line and priority is established. As illustrated, the data 414' is encoded in a non-return to zero inverted (NRZI) format, where a change in value is a one and no change in the value is a zero. The gateways 46 and 48(1)-48(M) transmitting respective priority values will transmit a logical one by driving a transition to change the state of the external bus 38 and then go to a high-impedance state. The signals on the external bus 38 are held in their current state using a keeper circuit (not illustrated) so that the external bus 38 is held in the present logic state if there is no gateway actively driving the external bus 38. One of the gateways 46 and 48(1)-48(M) sends a logical zero by not changing the state of the external bus 38. Using this method, a logical one will take precedence over a logical zero. Any of the gateways 46 and 48(1)-48(M) that is sending the bus error halt sequence is sending the most urgent priority value, and thus, no other higher priority value can exist, so any of the gateways 46 and 48(1)-48(M) that are transmitting the bus error halt sequence will win the arbitration phase 406. Since all of the gateways 46 and 48(1)-48(M) transmitting the most urgent priority value are asserting the same values on the external bus 38, there is no problem with contention.

With continued reference to FIG. 13, having won the arbitration phase 406, the winning gateway transmits no data 502 during the data phase 422. Likewise, the winning gateway drives the SCLK to zero (denoted at 504) until a bus timeout condition occurs at time 506. Detection of the bus timeout condition causes the system reset as previously indicated.

Figure 14:
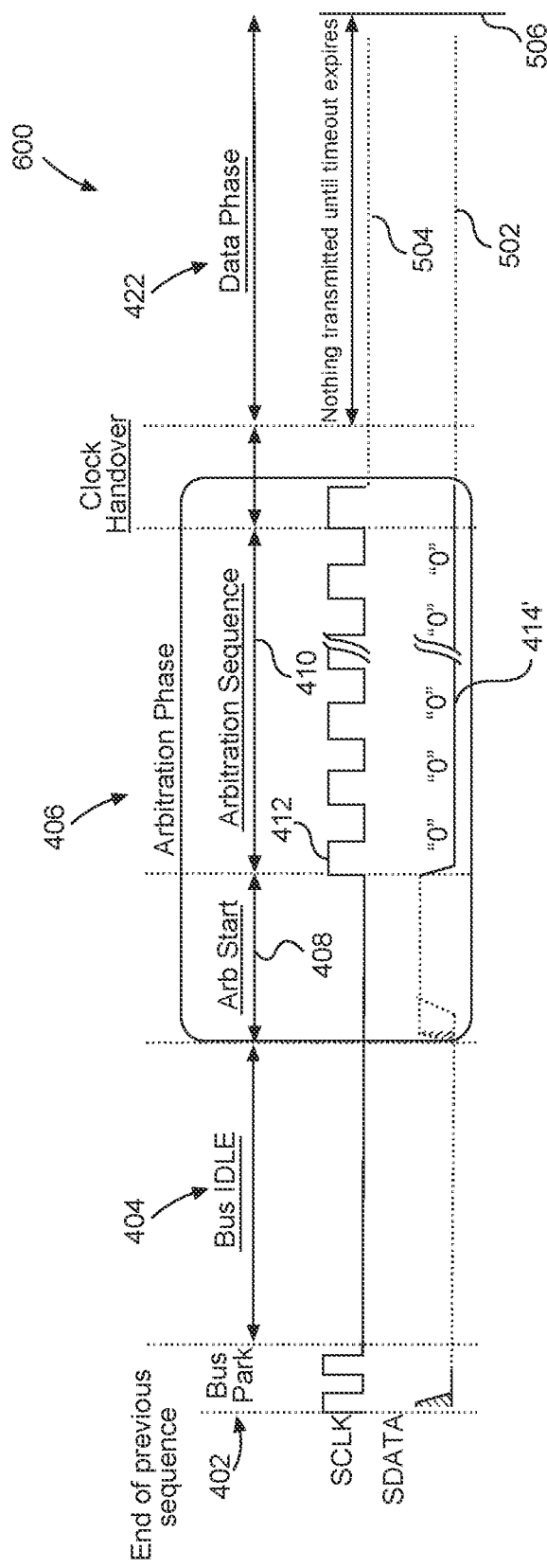
FIG. 14 is an alternate exemplary bus sequence for the bus halt, where the bus does not have a keeper circuit, but has a wire-AND arbitration.

Similarly, FIG. 14 illustrates a signal diagram 600 for the bus error halt sequence where the external bus 38 implements a wire-AND function. That is, the external bus 38 has a pull-up resistor (not illustrated) instead of the keeper circuit, and an all-zero priority value is the most urgent value (denoted generally at 414"). A logical zero is transmitted by one of the gateways 46 and 48(1)-48(M) pulling the external bus 38 low, and a logical one is transmitted by one of the gateways 46 and 48(1)-48(M) not driving the external bus 38. If no gateway drives the external bus 38, the pull-up resistor pulls the external bus 38 to logical one. However, as illustrated, at least one of the gateways 46 and 48(1)-48(M) asserts the most urgent priority value and wins the arbitration phase 406. Then, as previously described, the winning gateway(s) transmits no data 502 during the data phase 422 and drives the SLCK to zero (denoted at 504) until the bus timeout condition occurs at the time 506.

The interface fabric for interchip and intrachip communication according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A computing system comprising:
   a first integrated circuit (IC) comprising:
      a first node comprising a first transmitter and a first receiver;
      a first gateway comprising:
         a first external interface;
         a first status table configured to:
            register the first node; and
            indicate availability of the first node; and
         a first internal interface communicatively coupled to the first node and configured to communicate therebetween;
   a second IC comprising:
      a second node comprising a second transmitter and a second receiver;
      a second gateway comprising:
         a second external interface;
         a second status table configured to:
            register the second node; and
            indicate availability of the second node; and
         a second internal interface communicatively coupled to the second node and configured to communicate therebetween; and
   a bus coupled to the first gateway of the first IC and the second gateway of the second IC and configured to carry signals therebetween.

2. The computing system of claim 1, wherein the first node further comprises a third node coupled to the first gateway.

3. The computing system of claim 2, wherein the third node is configured to communicate with the first node based on availability as indicated in the first status table.

4. The computing system of claim 1, wherein the second gateway is configured to broadcast availability information about the second node to the first gateway.

5. The computing system of claim 4, wherein the first gateway is configured to store the availability information about the second node based on the broadcast from the second gateway.

6. The computing system of claim 1, wherein the second gateway is further configured to request configuration data from the first gateway.

7. The computing system of claim 1, wherein the first gateway is further configured to:
responsive to the first node changing availability state, update the first status stable to reflect a changed state for the first node.

8. The computing system of claim 7, wherein the first gateway is further configured to:
generate a scout message with information related to the changed state for the first node; and
send the scout message to the second gateway.

9. The computing system of claim 8, wherein the second gateway is further configured to:
receive the scout message; and
update the second status table based on the scout message.

10. The computing system of claim 1, wherein the first gateway is further configured to:
receive a message request from the first node to the second node;
determine if the second node is available based on information about the second node in the first status table; and
instruct the first node to send a message associated with the message request across the bus based on the information about the second node in the first status table.

11. A method for populating a status table for network nodes within a computing device, the method comprising:
activating a first integrated circuit (IC) coupled to a bus;
registering first nodes associated with the first IC with a first gateway;
populating a first status table at the first gateway with information about the first nodes associated with the first IC;
permitting intrachip communication between the first nodes associated with the first IC based on availability as indicated in the first status table;
activating a second IC coupled to the bus;
registering second nodes associated with the second IC with a second gateway;
populating a second status table at the second gateway with information about the second nodes associated with the second IC;
requesting, by the second gateway, configuration data from the first gateway; and
populating the second status table at the second gateway with the information about the first nodes associated with the first IC based on the information about the first nodes associated with the first IC from the first status table at the first gateway.

12. The method of claim 11, further comprising broadcasting, from the second gateway, across the bus, the information about the second nodes associated with the second IC stored in the second status table.

13. The method of claim 11, further comprising:
responsive to a changing node of the first nodes changing state, updating the first status table to reflect a changed state for the changing node;
generating a scout message at the first gateway with information related to the changed state for the changing node; and
sending the scout message from the first gateway to remote gateways communicatively coupled to the bus.

14. The method of claim 13, further comprising:
receiving the scout message at the second gateway; and
updating the second status table based on the scout message.

15. The method of claim 11, further comprising:
receiving a message request from an initial node within the first IC to a destination node at the second IC;
determining if the destination node is available based on information about the destination node in the first status table; and
instructing the initial node to send a message associated with the message request across the bus if the destination node is available.

16. The method of claim 11 further comprising:
receiving, at the second gateway from the first gateway, status and configuration information relating to the first nodes; and
populating the second status table based on the status and configuration information relating to the first nodes.

17. The method of claim 11, further comprising requesting, by the second IC, status and configuration information relating to at least one of the first nodes responsive to the second IC being coupled to the bus.

* * * * *